United States Patent [19]

Bährle et al.

[11] 4,393,922
[45] Jul. 19, 1983

[54] ENGINE UNIT WITH LUBRICANT COOLING

[75] Inventors: Friedrich Bährle, Kernen; Helmut Wulf, Ostfildern, both of Fed. Rep. of Germany

[73] Assignee: Daimler-Benz Aktiengesellschaft, Fed. Rep. of Germany

[21] Appl. No.: 227,372

[22] Filed: Jan. 22, 1981

[30] Foreign Application Priority Data

Jan. 22, 1980 [DE] Fed. Rep. of Germany ....... 3002155

[51] Int. Cl.$^3$ .................................... F28F 15/00
[52] U.S. Cl. .................................... 165/41; 165/51; 165/104.21; 123/41.33; 74/606 A; 184/104 B
[58] Field of Search ............ 165/41, 51, 104.26; 74/606 A, 607; 184/104 A, 104 B; 123/41.33; 92/153

[56] References Cited

U.S. PATENT DOCUMENTS 3,884,293 5/1975 Pessolano et al. ............ 165/51

OTHER PUBLICATIONS

Designer's Guide to Heat Pipes, Basiulis and Hummel, from Design News, pp. 159–184, 1974.

*Primary Examiner*—James C. Yeung
*Assistant Examiner*—Margaret A. Focarino
*Attorney, Agent, or Firm*—Craig & Burns

[57] ABSTRACT

An engine unit adapted to be lubricated by a liquid lubricant with a lubricant reservoir as well as a lubricant cooling. The cooling takes place by way of at least one heat pipe, with the heat pipe having a heat absorbing portion adapted to be exposed to the lubricant and a heat transmitting portion adapted to be exposed to surrounding air. The engine unit may be an internal combustion engine, a gear system such as a change-speed transmission or differential transmission of a vehicle drive axle.

4 Claims, 7 Drawing Figures

ENGINE UNIT WITH LUBRICANT COOLING

The present invention relates to an engine unit and, more particularly, to an engine unit lubricated with liquid lubricant from a lubricant reservoir as well as with lubricant cooling.

There exists a danger of overheating of the lubricant, especially in internal combustion engines and, for this reason, engines are frequently provided with a lubricant cooler. In forced-circulation lubrications, the lubricant pump may also be utilized for urging the lubricant through an oil cooler. In mere splash lubrication systems, wherein the danger of oil overheating may exist in certain circumstances, in addition to an oil cooler, a further component would be necessary merely to effect a lubricant cooling with such further component being a circulating pump. Consequently, not only does lubricant cooling become rather complicated and expensive but also relatively difficult, which is a troublesome factor especially in the case of utilization in motor vehicles.

In German Offenlegungsschrift [German Unexamined Laid-Open Application] No. 2,745,931, an oil cooler arrangement is proposed for forced-circulation cooling, with the oil cooler being integrated into the wall of an oil pan of an internal combustion engine. In this proposed system, another cooling medium of, for example, the coolant of a cooling system of the internal combustion engine is forcibly circulated in a heat-absorbing fashion through cavities of the wall-integrated liquid/liquid cooler. Such a complicated forced-circulation cooling with a separate cooling medium may be employed in splash lubrications or in units which are not cooled by a separate cooling fluid only at intolerably high costs.

The aim underlying the present invention essentially resides in providing an effective lubricant cooling arrangement which is readily utilizable, without problems regarding space, costs, and weight, even in splash lubrication systems.

In accordance with advantageous features of the present invention, the cooling of the lubricant is to be effected by means of at least one heat pipe with the heat-absorbing portion of the heat pipe being exposed to the lubricant and the heat-transmitting portion being exposed to surrounding air. A number of heat pipes have been proposed with the heat pipes taking the form of an evacuated, hermtically tightly closed cavity formed from a material of high heat conductivity, preferably in a pipe or plate form, with a fraction of the cavity being filled with a vaporizable and condensible heat-transfer medium. The remaining portion of the cavity is otherwise evacuated or filled with an inert gas. The selection of the heat-transfer medium is dependent upon the temperature level at which the heat is to be transferred. An interior of the heat pipe may be partially equipped with a capillary structure so as to enable a return of the condensed heat-transfer medium from the heat-emitting point to the heat-absorbing point. This capillary structure may, for example, take the form of a lining of the pipe with a mesh fabric or by imparting a grooved structure to an inner surface of the pipe. At a hot point of the heat pipe, where thermal energy is supplied, the introduced medium is vaporized and quickly expands in an interior of the heat pipe. At heat-emitting points of the heat pipe, the vaporized medium is reprecipitated and condenses on a wall of the heat pipe, thereby transferring its heat to the wall of the heat pipe. The condensate creeps back by a capillary action of the capillary structure to the heat supply points of the heat pipe. The amount of heat transferred from the heat-transfer medium to the walls of the heat pipe on the condensate side is removed on the outside by radiation, by convection, or by heat conductance. Since a phase change of the heat-transfer medium takes place at the heat-absorbing and heat-transmitting points of the heat pipe, the conversion energy required essentially for the phase change is transmitted in the form of thermal energy. Since the transformation energies, based upon the mass of the heat-transfer medium, are substantially larger than the amounts of energy storable by heating a medium, it is possible to transfer, by transporting relatively small quantities of heat-transfer medium, a large amount of heat even over relatively large distances. Additionally, by imposing a certain pressure on an interior of the heat pipe, care may also be taken so that the heat transfer takes place only up to a quite specific temperature. By virtue of the capillary action of the capillary structure, a return of the condensate may also be effected against gravity, up to certain limits.

In German Patent Application Ser. No. 28 39 365 and corresponding U.S. patent application Ser. No. 068,561, a heat pipe arrangement is proposed for cooling an internal combustion engine; however, this proposed construction involves a different utilization of the heat pipe than for lubricant cooling.

Advantageously, in accordance with the present invention, the heat pipe may be made as an integral part of the wall of the lubricant reservoir and/or of a housing wall of an engine unit exposed to the lubricant. Suitably, the heat pipe may be in the form of ribs having a hollow construction.

While the heat pipes in accordance with the present invention may be arranged with their heat-absorbing portions at the lubricant reservoir, it is also possible for the heat pipes to be arranged with their heat-absorbing portion in a zone of a high reflux stream of the lubricant into the reservoir.

In accordance with further advantageous features of the present invention, it is possible for more than one heat pipe to be provided with the heat-absorbing portion of the heat pipe or pipes having at least an approximately circular cross-sectional configuration with the heat-transmitting portion being fashioned as a plate-type heat-exchanger having at least one plate. Advantageously, the heat pipe or heat pipes form an integral part of the wall of the lubricant reservoir, which wall is adapted to be exposed to ambient air on the outside and/or an integral part of a housing section of the engine unit exposed to lubricating oil.

The wall of the lubricant reservoir and/or a lubricating oil-exposed housing section may be manufactured by casting, with cavities being formed at the wall, which cavities penetrate the wall in the manner of ribs, stay bolts or the like, and project toward an inside as well as toward an outside, with the cavities constituting heat pipes.

Advantageously, with the engine unit in an installed position and ready for operation, the heat-transmitting portion of the heat pipes lies geodetically higher than the heat-absorbing portion.

The heat-transfer medium contained or accommodated in the heat pipe or pipes in accordance with the present invention is under such a pressure that the heat-transfer medium is vaporized only at and/or above an operating temperature of the lubricant.

The engine unit may, in accordance with the present invention, take the form of an internal combustion engine or a gear system. The gear system may take the form of a differential transmission of a vehicle drive axle or a change-speed transmission for a motor vehicle.

It is also possible in accordance with the present invention for the gear system to be a hydraulic gear system wherein the waste heat is removed by means of at least one heat pipe.

It is also possible in accordance with the present invention to integrally form at least one heat pipe into a wall of an oil pan of an internal combustion engine.

In accordance with still further features of the present invention, the heat pipe or heat pipes may be integrated into a wall of a rocker arm cover of an internal combustion engine or integrated into an engine block of an internal combustion engine.

An advantage of the lubricant cooling arrangement of the present invention resides in the fact that, especially in the case of rear axle drive mechanisms, a uniform lubricant temperature can be provided independently of the respectively transmitted and/or consumed power in the engine unit.

Previously, in engine units without lubricant cooling, the situation was such that the oil selection was made in accordance with the operating point having the highest friction loss and thus the highest degree of heating of the lubricant. At lower efficiencies, a lower lubricating oil temperature was obtained and thus a higher oil viscosity. This, in turn, resulted in increased oil friction and greater power demand for the splashing of oil, which, in turn, represented an additional burden on the degree of efficiency of the engine unit. However, thanks to a self-regulating lubricant cooling feature as proposed by the present invention, it is possible to set, independently of the power, an approximately constant lubricant temperature so as to achieve a uniform viscosity for the lubricant. Thus, it is possible for one to initially select a lower oil type having a lower viscosity which is more favorable for an entire operating range of the engine unit. As can readily be appreciated, by enabling such a selection, not an inconsiderable rise in degree of efficiency is attained during a partial load range operation of the engine unit.

The above-mentioned self-regulating lubricant cooling feature of the present invention by means of heat pipes can be attained by providing that the heat-transfer medium is vaporized only at and/or above the operating temperature of the lubricant by means of a suitable selection of the heat-transfer medium and a corresponding pressure within the heat pipe, thereby ensuring that an appreciable activity of the heat pipe or heat pipes begins only above an operating temperature of the lubricant. For example, if an operating temperature of the lubricant is desired to be in the range of 80° to 90° C., temperatures in the range of 120° to 140° C. are deleterious and should be safely avoided.

Advantageously, the heat-transfer media suitable to be utilized in accordance with the present invention are refrigerants, such as, for example, acetones, "Freons", ammonia, or alcohols with a larger or smaller proportion of water. As long as the heat-transfer medium has not yet attained its boiling point within the heat pipe, it is still present almost entirely in the liquid phase, and the circuit between the vapor phase and liquid phase, which is required for heat transfer through the heat pipe, is interrupted. It is only once the heat-transfer medium has reached its boiling point that it is possible for the circuit between the vapor phase and liquid phase to be established, thereby enabling a corresponding heat transfer to be effected.

As can readily be appreciated, the heat transfer and, accordingly, the cooling efficiency is the more intense with the higher the temperature gradient. The cooling efficiency is greatly increased by exceeding the boiling point by just a few degrees. Therefore, the range of operating temperatures obtained under practical conditions is limited even in the case of relatively high friction losses to 10°–20° C. above the boiling point of the heat-transfer medium within the heat pipe.

Accordingly, it is an object of the present invention to provide an engine unit with lubricant cooling which avoids, by simple means, shortcomings and disadvantages encountered in the prior art.

Another object of the present invention resides in providing an engine unit with lubricant cooling which may readily be employed not only in forced circulation lubrication systems but also in splash lubrication systems.

A further object of the present invention resides in providing an engine unit with lubricant cooling which is simple in construction and therefore relatively inexpensive to manufacture.

A still further object of the present invention resides in providing an engine unit with lubricant cooling which requires a minimum of installation space and which has a relatively light weight.

Yet another object of the present invention resides in providing an engine unit with lubricant cooling which ensures the attainment of a uniform lubricant temperature independent of a transmitted and/or consumed power in the engine unit.

Yet another object of the present invention resides in providing an engine unit with lubricant cooling which is self-regulating.

These and other objects, features, and advantages of the present invention will become more apparent from the following description when taken in connection with the accompanying drawing which shows, for the purposes of illustration only, several embodiments in accordance with the present invention, and wherein.

Figure 1:
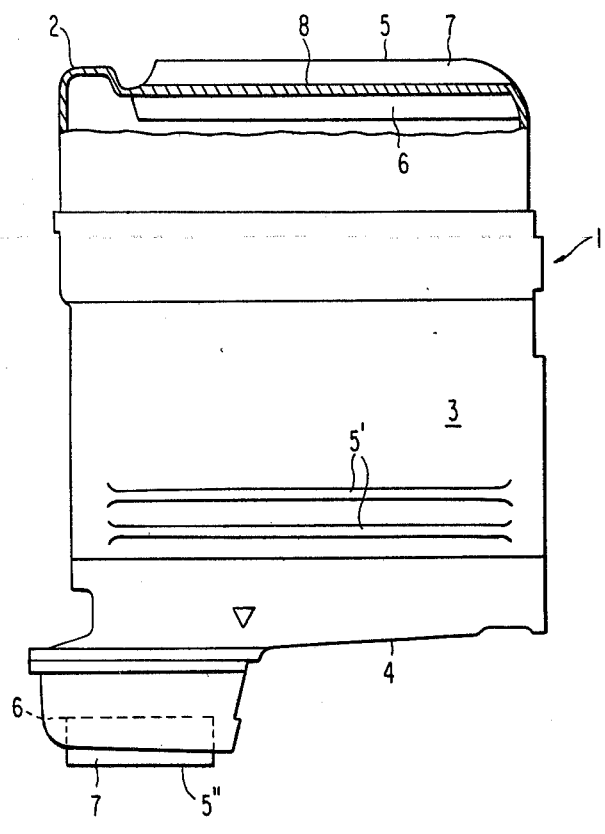
FIG. 1 is a lateral partially schematic view of an internal combustion engine equipped with wall-integrated heat pipes at several locations for lubricant cooling in accordance with the present invention.
Figure 2:
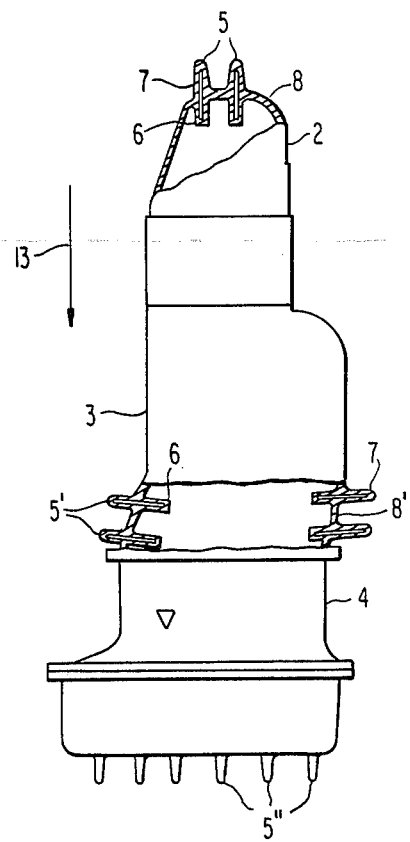
FIG. 2 is a partial cross-sectional frontal view of the internal combustion engine of FIG. 1.

Referring now to the drawings wherein like reference numerals are used throughout the various views to designate like parts and, more particularly, to FIGS. 1 and 2, according to these figures, an internal combustion engine generally designated by the reference numeral 1 includes a rocker arm or cylinder head cover 2, an engine block 3, and an oil pan 4. The valve control means (not shown) for the internal combustion engine 1 are located beneath the rocker arm or cylinder head cover 2 and, as is known, the valve control means require a high proportion of the entire lubricant needed for the internal combustion engine 1. In operation of the internal combustion engine 1, the cams, rocker arms and oscillating valves of the valve control means eject the lubricating oil fed thereto intensively against an inside surface of the rocker arm cover 2. In order to enable a certain proportion of the heat of the lubricant to be transmitted to the ambient air, at least two rib-like heat pipes 5 are mounted on a housing wall 8 of the rocker arm cover 2. In a lower part of the engine block 3, the lubricating oil is fed to the engine parts of the internal combustion engine 1 by being intensively sprayed against a wall 8' of the engine block 3. In order to enable a removing of heat from the lubricating oil in the lower portion of the engine block 3, one or more rib-like heat pipes 5' are arranged on respective sides of the engine block 3. In order to enable the removal of heat from the lubricant in an oil sump of the internal combustion engine 1, a plurality of wall-integrated rib-like heat pipes 5" are arranged in the oil pan 4.

The rib-shaped heat pipes 5, 5', 5" are each disposed so that the heat absorbing portions 6 extend into the lubricant and/or are exposed to the lubricant, with a heat transferring outer portion 7 of the heat pipes being exposed to ambient air. The rib-like heat pipes 5, 5' respectively arranged at the rocker arm cover 2 and at the engine block 3 are disposed so that they readily provide for a return of condensate in a direction of gravity indicated by the arrow 13 to the heat absorbing portion 6, even without a capillary structure, when the heat pipes 5, 5' are in an installed position of the internal combustion engine. With the rib-like heat pipes 5", arranged in the oil pan 4, a return transport is possible only in a direction against the direction of gravity 13 with the aid of a good capillary structure.

Figure 3:
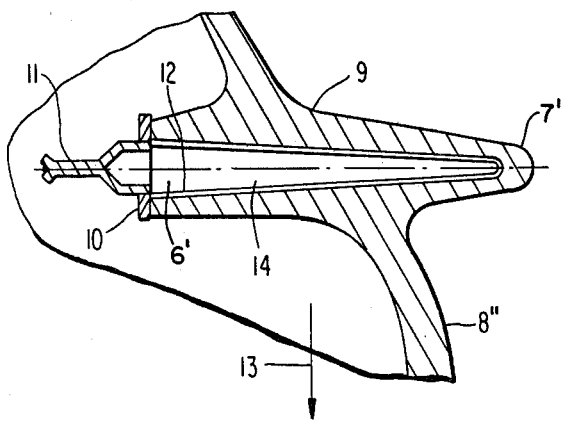
FIG. 3 is a partial cross-sectional view of a wall-integrated heat pipe in accordance with the present invention in one installation position.

FIG. 3 provides an example of an individual installation of a pin-shaped heat pipe 9 integrated into a wall 8" of a housing part. The heat pipe 9 may essentially be produced at the same time the housing wall 8 is cast and, as shown in FIG. 3, the heat pipe may take the form of a narrow conical cavity 14 which has, in an interior thereof, a capillary structure 12. The capillary structure 12 may be formed, for example, by a wall roughness of the casting. The conical shape of the cavity 14 is merely due to a taper stemming from the casting process. The inside of the cavity 14, open during a casting thereof, is hermetically tightly sealed by a closure plate 10 which is provided with a filling tube 11 for enabling a filling of a heat transfer medium to the cavity 14. The closure plate 10 may, for example, be attached at the opening of the cavity 14 by hard soldering or brazing. In addition to enabling a filling of a heat transfer medium into the cavity 14, the filling tube 11 may also be utilized to evacuate the heat pipe 9, with the heat pipe 9 being hermetically sealed by pinching off and welding the filling tube 11 closed.

Figure 4:
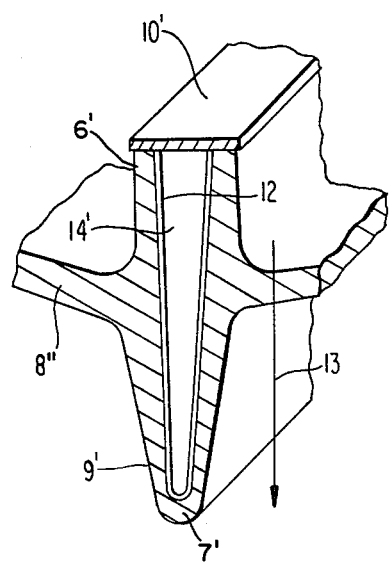
FIG. 4 is a partial cross-sectional detailed view of a wall-integrated heat pipe in accordance with the present invention in another installation position.

In contrast to a pin-shaped heat pipe 9, as shown in FIG. 4, a rib-like heat pipe 9' may be provided with a wedge-shaped cavity 14 in a strip-like closure 10'. As shown in FIG. 4, in an installation position, the heat pipe 9' is arranged, relative to the direction of gravity 13 such that the outer heat transmitting portion 7' lies geodetically lower than the inner heat absorbing portion 6'. For the sake of completeness, it should be noted that during casting, the open side of the cavity 14 may also be arranged on the other outer side of the housing wall 8" so that the closure plate 10 or 10' may also be disposed at the outer heat transmitting portion 7' of the heat pipe 9 or 9'. The determining factors relating to the disposition of the closure plate 10 or 10' are, above all, appearance and a construction which is more favorable from a viewpoint of flow dynamics as well as providing protection for the filling tube 11. More particularly, with the filling tube 11 disposed on the outside of the housing wall 8', the filling tube could readily be torn off due to the external mounting by way of an unintended impact thereon and, for this reason, an interiorly positioned heat absorbing side 6' of the heat pipe 9 or 9' is preferable for being the open side to be sealed by the closure plate 10 or 10'.

Figure 5:
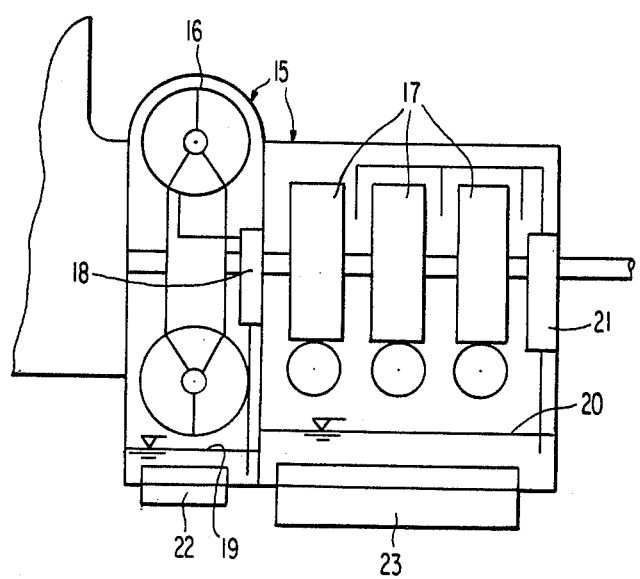
FIG. 5 is a schematic view of a change-speed transmission for a motor vehicle provided with a lubricant cooling arrangement for a mechanical portion of the transmission in accordance with the present invention.

As shown in FIG. 5, an automatic change-speed transmission generally designated by the reference numeral 15 for a motor vehicle is provided which includes a hydrodynamic section with a hydrodynamic operating cycle 16 and a mechanical section with several gear stages 17. In the hydrodynamic section, a separate filling pump 18 is provided for the hydrodynamic operating circuit or cycle which, in the illustrated embodiment, replenishes the operating cycle with lubricant from a lubricant or oil sump 19. The pump 18 maintains a circulation between the hydrodynamic operating cycle or circuit 16 on the one hand and the oil sump 19 on the other hand so that, within a certain time interval, the entire amount of operating lubricant or oil is circulated once. In order to cool the operating medium of the hydrodynamic working circuit 16, several rib-like heat pipes 22 are integrally formed with a wall of the oil sump 19. The heat pipes 22 extend, in part, into the operating medium and can be exposed to the surrounding air by way of externally disposed parts.

Additionally, the mechanical section of the transmission 15 is provided with a lubricant pump 21 which is adapted to conduct a lubricant from a sump 20 to points where the lubricant is required. Wall-integrated rib-like heat pipes 23 are provided in the mechanical section for removing heat from the operating medium such as lubricant to the ambient air. Thus, the transmission 15 is provided with a cooling means, i.e., heat pipes 22 for the operating fluid of the hydrodynamic operating circuit 16 and, separately therefrom, a cooling means, i.e., heat pipes 23, for the mechanical portion of the transmission 15.

As can readily be appreciated, with the transmission 15, it is also possible to provide, in lieu of the bottom disposed arrangement of the heat pipes 22 or 23, even more suitably a lateral arrangement of the heat pipes 22, 23 similar to that of the heat pipes 5' arranged at the engine block of the internal combustion engine 1 as shown in FIGS. 1 and 2, with a slightly inclined arrangement of the heat pipes 22, 23 toward the inside so that the force of gravity may be utilized for returning the condensate to the interiorily positioned heat absorbing portions of the heat pipes 22, 23 so that the cooling effect of the heat pipes 22, 23 is favorably affected.

Figure 6:
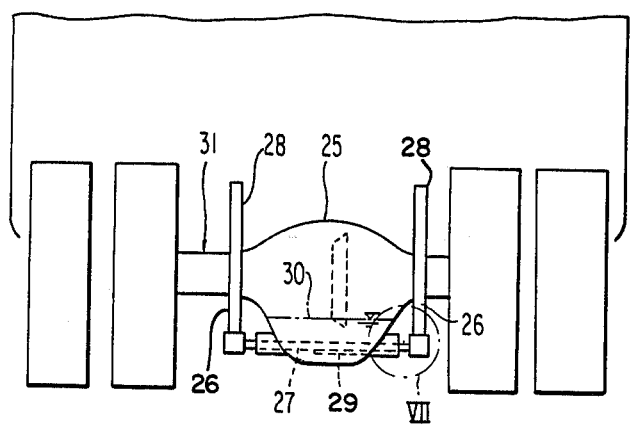
FIG. 6 is a partially schematic plan view of a lubricant cooling arrangement in accordance with the present invention for a rear axle transmission of a vehicle driving axle.

As shown in FIG. 6, a vehicle drive axle generally designated by the reference numeral 31 includes a rear axial or differential transmission or gear 25, with the transmission 25 normally not being provided with a forced-circulation lubrication system but merely with a splash lubrication system. With the heavy use of vehicles, it is possible in such a rear axle or differential transmission 25, in certain situations, to encounter an overheating of the lubricant or at least a premature thermally evoked aging of the lubricant. Additionally, due to thermally caused reductions in viscosity, the lubricating efficiency and capability for formation of hydrodynamic lubricating film may be decreased. In order to maintain a favorable operating temperature and a high lubricating efficacy of the lubricant, a lubricant cooling arrangement can be effected by virtue of the provision of at least one heat pipe 26 at the rear axle or differential transmission 25.

Figure 7:
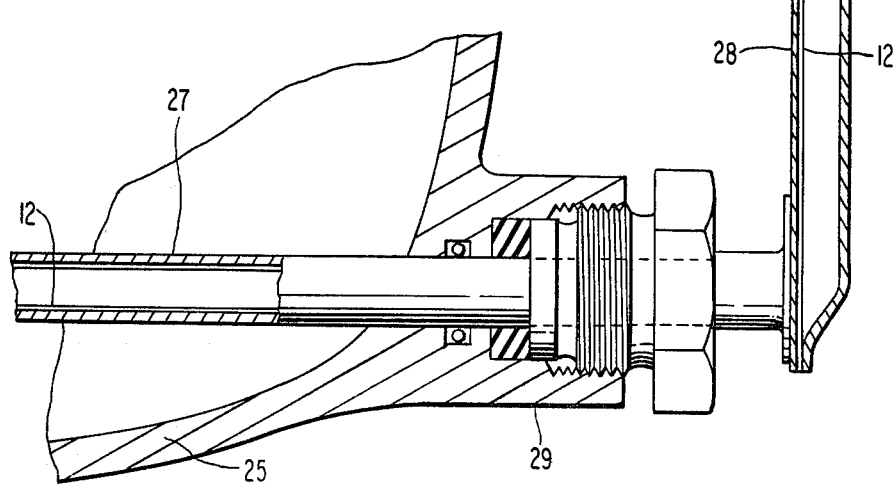
FIG. 7 is a partial cross-sectional individual view, on an enlarged scale, of a detail denoted by the circle VII in FIG. 6.

As shown most clearly in FIGS. 6 and 7, one or more heat pipes may extend, with one or several heat absorbing portions 27, constructed so as to have a circular or round cross sectional configuration, through a housing bore 29 into an oil sump 30 of the gear box of the rear axle or differential transmission 25. Externally disposed heat-transmitting portions 28 of the heat pipes 26 may be fashioned so as to be plate shaped and formed of two sheet metal plates which are tightly hermetically sealed to each other by, for example, welding. Due to the plate shaped construction of the heat transmitting portions 28, a larger surface area is obtained not only for the condensation of the heat transfer medium but also for a convective heat dissipation to the ambient air. In a liquid phase, the heat transfer is more favorable on the outside of the heat pipe portion 27 as well as on the inside thereof so that the location of a smaller surface area may be provided.

While we have shown and described several embodiments in accordance with the present invention, it is understood that the same is not limited thereto but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. A differential gear of a vehicle driving axle lubricated by means of a liquid lubricant, having a lubricant collecting pipe as well as having a lubricant cooling system, comprising a heat pipe, with its heat-receiving part, that is circular in its cross section, projecting directly into the lubricant collecting space in an area of an especially high reflux current or turbulence of the lubricant in the collecting space; the heat-emitting part of the heat pipe, in the operational installation position of the differential gear, is geodetically higher than its heat-receiving part; and the heat-emitting part of the heat pipe is formed in a plate-shaped manner, of two sheet-metal plates that are welded to one another so that they are hermetically tight, with the heat-emitting part being exposed to ambient air and being aligned in the driving direction of the vehicle, where the surface in the heat-emitting part of the heat pipe that can be used for the formation of the condensate is larger than the surface in the heat-receiving part that can be used for the evaporation.

2. The apparatus according to claim 3, wherein the heat absorbing portion of the at least one heat pipe means is disposed in an oil pan means, and a capillary means is disposed interiorly of the at least one heat pipe means in the oil pan means for enabling a return transport of a heat transfer medium of the heat pipe means.

3. The apparatus according to claim 1, wherein a heat transfer medium is accommodated in the at least one heat pipe means under a pressure such that the heat transfer medium is vaporized only at least at one of an operating temperature or above an operating temperature of the lubricant.

4. The apparatus according to claim 1, wherein the at least one heat pipe contains a heat transfer medium under pressure such that the heat transfer medium is vaporized and the heat transfer medium is accommodated in the at least one heat pipe means under a pressure such that the heat transfer medium is vaporized only at least at one of an operating temperature or above an operating temperature of the lubricant.

* * * * *